April 30, 1963  C. S. GLENNY  3,087,661
SADDLE BASKET BRACKETS
Filed Sept. 14, 1961
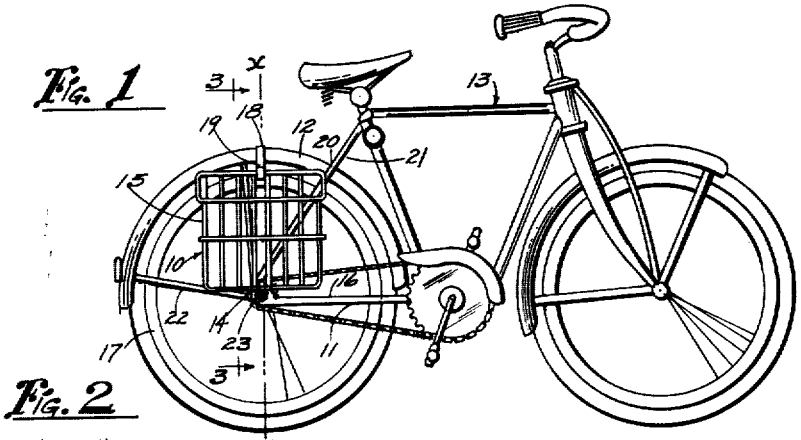
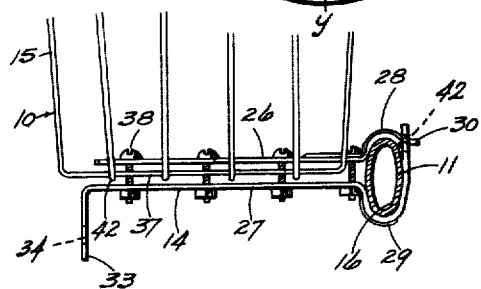
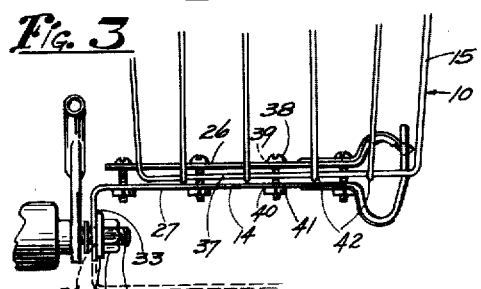
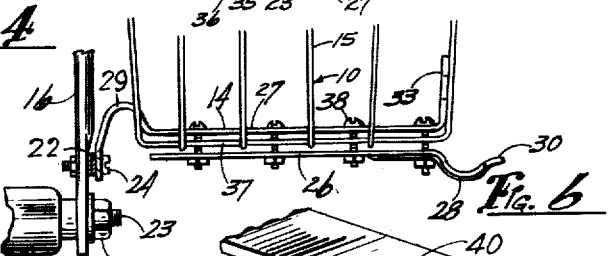
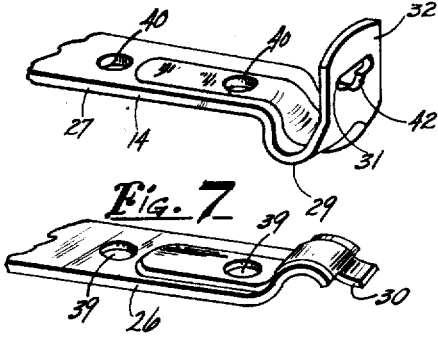
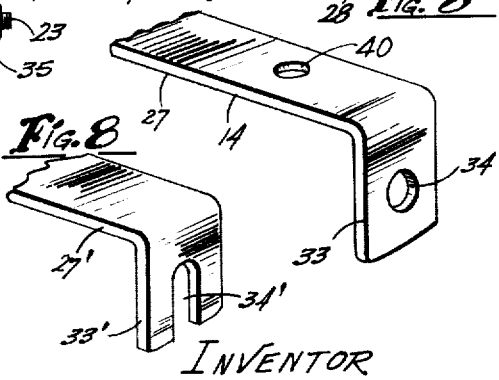
INVENTOR
CLARENCE S. GLENNY, DECEASED,
by MARGARET GLENNY, ADMINISTRATOR,
ATTY.

United States Patent Office 3,087,661
Patented Apr. 30, 1963

3,087,661
SADDLE BASKET BRACKETS
Clarence S. Glenny, deceased, late of Rockford, Ill., by Margaret Glenny, administrator, Rockford, Ill., assignor to The Washburn Company, Worcester, Mass., a corporation of Massachusetts
Filed Sept. 14, 1961, Ser. No. 138,196
5 Claims. (Cl. 224—32)

This invention relates to new and improved dual carrier baskets for application to the opposite sides of the rear portions of bicycles, the present ones relying for their support partly upon attachment to the rear fender and partly upon attachment either to the frame or rear axle, the construction herein disclosed being in the nature of an improvement upon that disclosed in Patent 2,890,819.

The novel attaching means provided in accordance with the invention have been designed with a view to:

(1) Ease of assembly on a bicycle so that a person having little mechanical ability will not find it too difficult to apply the baskets to a bicycle satisfactorily;

(2) Adjustability and adaptability of the attachments to suit different makes and models of bicycles, the present attachments enabling mounting the baskets spaced outwardly from both sides of the frame far enough to leave ample operating clearance between the frame and baskets for projecting items of equipment provided on certain bicycles;

(3) Reasonably quick and easy detachability of the baskets from the bicycle without sacrificing rigidity and security of connection when attached, it being recognized that some youngsters, who need these baskets for carrying newspapers, prefer to have the baskets on the bicycle only while they are being used for that purpose, and (4) Minimum damage to the finish on the bicycle in the fastening of the attachments to the frame and fender.

The salient feature of the present construction is the provision of attaching brackets at the bottom of the assembly under the baskets for connection with the opposite sides of the frame or opposite ends of the rear axle interchangeably, each bracket consisting of a pair of elongated plates for abutment with the inner and outer sides of the wire bottom wall of the associated basket and having generally C-shaped jaw portions on the ends thereof, one of said C-shaped jaw portions having a specially perforated extension and the other C-shaped jaw portion having a horizontally outwardly projecting lug thereon adapted to fit in the aforesaid perforation, whereby:

(a) One of the plates, which has a perforated right angle end portion remote from the C-shaped jaw portion can have this right angle end portion attached to the rear axle of the bicycle in the event the baskets are to be attached there, instead of onto the frame, with the right angle end portion projecting downwardly from above or upwardly from below, which ever is preferred, or (b) The two plates can be assembled with their C-shaped jaw portions in opposed relation to receive therebetween the lower rear fork portion of the bicycle frame, the lug entered in the perforation positively preventing spreading apart of the jaw portions, or (c) The perforated extension can be attached by means of the bolt that is otherwise used only for fastening the fender bracket to the lower rear fork portion of the bicycle frame.

The invention is illustrated in the accompanying drawing, in which—

FIG. 1 is a side view of a bicycle equipped with dual carrier baskets made in accordance with the invention;

FIG. 2 is a rear view of the left hand basket and the attaching means shown applied to the rear fork of the bicycle, which appears in section;

FIG. 3 is a rear view of the right hand basket and the attaching means shown applied to the rear axle on the bicycle, an alternative position for the lower one of the pair of elongated plates that attaches to the rear axle being also indicated in dotted lines, this view being on line 3—3 of FIG. 1;

FIG. 4 is another rear view of the right hand basket and attaching means showing the perforated extension of the C-shaped jaw portion of the one plate fastened to the bolt that serves otherwise only to hold the fender bracket to the frame;

FIGS. 5 and 6 are perspective views of the opposite ends of one of the two attaching plates of a frame attaching bracket;

FIG. 7 is a perspective view of the C-shaped end of the other plate, having the lugs provided thereon adapted to fit in the slot seen in FIG. 5, as shown in FIGS. 2 and 3, and FIG. 8 is a perspective similar to FIG. 6 showing the provision of a slot in lieu of the hole.

Similar reference numerals are applied to corresponding parts throughout the views.

Referring to the drawing, the reference numeral 10 designates the dual carrier baskets of the invention generally, shown applied to the rear portion of the frame 11 and rear fender 12 of a bicycle indicated generally by the reference numeral 13. Two frame attaching brackets 14 are provided at the bottom of the assembly under the baskets 15 at the middle thereof for connection with the opposite sides of the lower rear fork portion 16 of the frame for support of the baskets in rigid relationship to the bicycle frame and parallel to the rear wheel 17 and spaced outwardly from both sides of the bicycle to the same appreciable extent as best appears in FIGS. 2, 3 and 5, to give good balance and easier riding of the bicycle and also afford ample clearance for any projecting attachment on the bicycle, such as a wheel-driven generator (not shown). The fender attaching bracket 18 which is of generally inverted U-shape and straddles and has connection with the middle portion of the rear fender 12 serves by connection of its opposed downwardly projecting arms 19 with the upper ends of the baskets 15 at the middle of their inner sides to further support the baskets in rigid relationship to the bicycle frame, due to the fact that the point of connection of the bracket 18 with the fender 12 is so close to the point where the fender 12 is fastened to the cross-portion 20 of the upright rear fork portion 21 of the bicycle frame. The rear end of the fender 12 is, of course, also supported against sidewise displacement by means of the usual fork 22 that connects either to the rear axle 23, as in FIG. 1, or, by means of a bolt 24, to a lug 25 provided on the lower rear fork 16 of the bicycle frame, as indicated in FIG. 4. The fender attaching bracket 18 is disposed approximately in the same vertical plane with the frame attaching brackets 14 mentioned previously, this plane passing through the middle portion of the two baskets 15 so that the load of newspapers placed in each basket is distributed symmetrically with respect to brackets 14 and 18, so that the baskets are not so apt to get bent out of shape. The loads in the two baskets are usually kept fairly evenly balanced for easier riding and steering, and, so long as neither basket is too greatly overloaded in relation to the companion basket, the side pull on the rear fender 12 will be fairly well balanced and there is no danger of the fender getting bent out of shape.

The two frame attaching brackets 14 supporting the two baskets 15 are of identical construction and may be used interchangeably on either side of the bicycle. FIGS. 2, 3 and 4 show three different ways in which a bracket 14 can be used; FIG. 2 showing the left hand basket 15 and the upper and lower plates 26 and 27 with their C-shaped jaw portions 28 and 29 in opposed interlocked relationship, with lug 30 on the C-shaped end 28 of place 26 engaged in slot 31 in the extension 32 on the C-shaped end 29 of plate 27 to clamp the bracket onto the lower rear fork 16, whereas FIG. 3 shows the right hand basket 15 with the C-shaped portions 28 and 29 of said plates at the other side of the basket 15 away from the bicycle and with the perforated right angle end portion 33 on the lower plate 27 receiving the axle 23 in the hole 34, so that the bracket can be clamped onto the frame of the bicycle by means of the axle nut 35 and washer 36. The hole 34 may be replaced by a vertical slot 34', as shown on plate 27' in FIG. 8, said plate being otherwise the same as plate 27. The slot 34' gives the advantage of easier assembly and disassembly, because the axle 23 can be entered therein without having to remove the nut 35 and washer 36. If desired, the right angle end portion 33 (or 33') on the lower plate 27 (or 27'), instead of projecting downwardly from above, as shown in full lines in FIG. 3, may project upwardly from below as indicated in dotted lines. In the latter event, the bracket assembly 14 may be reversed in relation to the wire bottom wall 37 of the basket 15, so that the plate 27 is above and the plate 26 is below said wall, the four bolts 38, which are entered through registering holes 39 and 40 in plates 26 and 27, respectively, and have nuts 41 threaded on their outer ends, being also reversed. Either holes 39 or holes 40 or both may be elongated into slots extending lengthwise of plates 26 and 27. Obviously, the horizontal wires 42 extending in a fore and aft direction in the bottom wall 37 of the basket are spaced apart far enough to permit a fair amount of adjustment of the baskets 15 farther away from the bicycle frame or closer to it, to suit the preference of the operator, both baskets of a pair being, of course, set alike on opposite sides of the bicycle for best appearance and best balance.

The slot 31, which extends horizontally, has a small semi-circular enlargement 42 on one side thereof at the middle, much smaller in diameter than hole 34 (about ¼" as compared to about 7/16"), and this enables entering the shank portion of the small bolt 24 through the extension 32 on the C-shaped end 29 of the lower plate 27 when it is desired to clamp the bracket 14 directly to the frame of the bicycle by means of this fender fastening bolt as shown in FIG. 4. The ¼" bolt 24, on the other hand, is much too large in relation to the width of slot 31 (about ⅛") to slip from hole 42 into the slot 31. The upper plate 26 under the conditions just described has its C-shaped end portion 28 disposed at the other end of the bracket assembly 14.

In operation, the fender-attaching bracket 18 is generally first applied to the fender 12 slightly forwardly with respect to a vertical line through the rear axle 23, assuming the frame-attaching brackets 14 are to be attached to the rear fork 16 as shown in FIG. 2. The load is, therefore, assumed fairly close to the point of connection of the fender 12 at 20 with the upright rear fork portion 21 of the bicycle frame. The frame-attaching brackets 14 are first applied loosely to the bottoms of the baskets 15 to permit freely adjusting the same forwardly or rearwardly relative to the baskets and in or out with respect to the bottom of the baskets to enable getting the baskets properly spaced outwardly with respect to the bicycle. Then the jaws formed by C-portions 28 and 29 on the frame-attaching brackets 14 are applied to the opposite sides of the lower rear fork 16, and the bracket 18 is loosely bolted onto the adjacent inner sides of the baskets 15. Then, when all of the assembled parts are adjusted relative to one another, so that the two baskets 15 are symmetrically arranged, all of the bolts are tightened. Thereafter, if the user decides to change the setting of the baskets, as might be found necessary or advisable because the baskets 15 were found to be too close to the pedals for comfort and free cycling, it is a simple matter to loosen the various bolts again and shift the entire basket assembly relative to the bicycle frame 11 and rear fender 12 and then tighten the bolts again. If the user wishes to remove the baskets 15 but leave the fender bracket 18 attached to the rear fender 12, he can do so by loosening the bolts attaching the inner sides of the baskets to bracket 18 and loosening bolts 38 a little more than enough to withdraw lugs 30 from slots 31, and, then, if the inner two bolts 38 on each of the brackets 14 are loosened enough to spread the jaws formed by the C-portions 28 and 29, the baskets 15 can be removed, and, as easily, replaced later. The application of the brackets 14 to the rear axle 23 or to bolts 24 alters the procedure above described only to the extent that the fender-attaching bracket 18 might be applied a little farther to the rear on the fender 12 if it is to be in the same vertical plane x—y with the frame-attaching brackets 14, but that is not essential. If plate 27 (or 27') is used with end portion 33 or 33') extending downwardly in either of these two other ways of mounting the baskets 15, the baskets are obviously disposed at a much higher elevation than where these plates are turned upside down, as seen in dotted lines in FIG. 3. FIG. 4 shows only the lower setting of plate 27, corresponding to the dotted line position of plate 27 in FIG. 3.

It is believed the foregoing description conveys a good understanding of the objects and advantages of the invention. The appended claims have been drawn to cover all legitimate modifications and adaptations.

What is claimed is:

1. In a bicycle having a frame including a substantially horizontal rear fork portion, and having a rear wheel mounted in said fork on a rear axle that is secured in place in said fork by means of nuts threaded on the opposite ends of said axle, a carrier basket disposed substantially vertically alongside said fork, and an elongated bracket horizontally disposed and secured to the bottom of said basket transversely thereof and adapted to be secured alternatively at one end to one side of said rear fork for fore and aft adjustment on said frame and rigid support on said fork in a desired spaced relationship to one of the pedals of the bicycle or to one end of said rear axle for similar support, said bracket comprising a pair of elongated horizontal plates disposed in substantially parallel relationship in adjustable abutment with the inner and outer sides of the bottom wall of the basket, and having bolts entered through registering openings in said plates to fasten the same together and to the bottom of said basket, disposed for clamping engagement therebetween, each of said plates having a C-shaped jaw portion on one end, which jaw portions when disposed in opposed relationship are adapted to have adjustable clamping abutment on the top and bottom of one side of the rear fork, the jaw portion on one of said plates having a substantially vertical extension in which a substantially horizontal slot is provided, the jaw portion on the other of said plates having a substantially horizontal lug projecting outwardly therefrom and adapted to be entered detachably in said slot when the C-shaped jaw portions of said bracket are in adjustable clamping abutment on the rear fork, whereby to prevent spreading apart of said jaw portions and consequent looseness of hold on said rear fork, and one of said plates having on the other end thereof a substantially vertical extension having a hole provided therein adapted to receive one end portion of the rear axle therein when the bracket is fastened to the axle by means of the axle nut, the other of said plates being reversible end for end when said perforated extension on the first mentioned plate is fastened to the rear axle, whereby to dispose the C-shaped jaw portion of said other plate in and out of the way position remote from the axle.

2. A bicycle basket structure as set forth in claim 1 wherein the bicycle includes a fender for the rear wheel having a support therefor and a bolt for fastening said support to the frame, and wherein the horizontal slot in the vertical extension of the jaw portion on one of said plates is enlarged intermediate its ends to provide an opening of enlarged diameter in relation to the transverse width of the slot adapted to receive said bolt and confine it against lateral displacement from the opening and into said slot, said bolt serving to fasten said jaw portion with the fender support onto the bicycle frame in spaced relation to the rear axle and to the rear fork.

3. A bicycle basket structure as set forth in claim 1 wherein the axle receiving hole in the vertical extension on the other end of one of said plates is an open-end vertical slot to facilitate connection with and disconnection from the axle by eliminating necessity for removal of the axle nut.

4. A bicycle basket structure as set forth in claim 1 wherein said plate with the vertical extension on the other end is reversible upside down so as to dispose the basket at different elevations relative to the axle.

5. A bicycle basket structure as set forth in claim 1 wherein said plate with the vertical extension on the other end is reversible upside down so as to dispose the basket at different elevations relative to the axle, the other plate being reversible end for end to dispose its jaw portion on one end for cooperative relationship to the other jaw portion or in remote retracted relationship thereto.

References Cited in the file of this patent

UNITED STATES PATENTS

| | | |
|---|---|---|
| 2,890,819 | Glenny | June 16, 1959 |
| 3,039,663 | Glenny | June 19, 1962 |

UNITED STATES PATENT OFFICE
CERTIFICATE OF CORRECTION

Patent No. 3,087,661                           April 30, 1963

Clarence S. Glenny, deceased, by Margaret Glenny, administrator

It is hereby certified that error appears in the above numbered patent requiring correction and that the said Letters Patent should read as corrected below.

Column 4, line 69, for "and" read -- an --.

Signed and sealed this 28th day of January 1964.

(SEAL)
Attest:

ERNEST W. SWIDER

Attesting Officer

EDWIN L. REYNOLDS

Acting Commissioner of Patents